US008581006B2

(12) United States Patent
Gieselman et al.

(10) Patent No.: US 8,581,006 B2
(45) Date of Patent: Nov. 12, 2013

(54) ESTER DISPERSANT COMPOSITION FOR SOOT HANDLING IN EGR ENGINES

(75) Inventors: Matthew D. Gieselman, Willoughby Hills, OH (US); John K. Pudelski, Cleveland Hts., OH (US); Renee A. Eveland, Concord Township, OH (US); Adam J. Preston, Willoughby, OH (US)

(73) Assignee: The Lubrizol Corporation, Wickliife, OH (US)

( * ) Notice: Subject to any disclaimer, the term of this patent is extended or adjusted under 35 U.S.C. 154(b) by 517 days.

(21) Appl. No.: 12/521,814

(22) PCT Filed: Jan. 4, 2008

(86) PCT No.: PCT/US2008/050240
§ 371 (c)(1),
(2), (4) Date: Dec. 29, 2009

(87) PCT Pub. No.: WO2008/086185
PCT Pub. Date: Jul. 17, 2008

(65) Prior Publication Data
US 2010/0130393 A1   May 27, 2010

Related U.S. Application Data

(60) Provisional application No. 60/883,608, filed on Jan. 5, 2007.

(51) Int. Cl.
*C07C 211/00* (2006.01)

(52) U.S. Cl.
USPC ........... 564/434; 564/305; 564/307; 564/433; 508/261; 508/267

(58) Field of Classification Search
None
See application file for complete search history.

(56) References Cited

U.S. PATENT DOCUMENTS

| 3,306,852 A | * | 2/1967 | Hendrickson | 508/288 |
| 4,234,435 A | | 11/1980 | Meinhardt et al. | |
| 4,803,004 A | * | 2/1989 | Andress et al. | 508/239 |
| 2006/0025316 A1 | | 2/2006 | Covitch et al. | |

FOREIGN PATENT DOCUMENTS

| GB | 1306529 | 2/1973 |
| WO | 98/17696 | 4/1998 |

OTHER PUBLICATIONS

Corresponding PCT Publication & Search Report No. WO 2008/086185 A1 dated Jul. 17, 2008.

* cited by examiner

*Primary Examiner* — Sudhakar Katakam
(74) *Attorney, Agent, or Firm* — Christopher D. Hilker

(57) ABSTRACT

Reaction of a carboxylic acid-containing polymer with certain aromatic amines and polyols results in ester containing dispersant viscosity modifiers with improved soot handling performance in heavy-duty diesel engines, compared with non-ester containing dispersants.

9 Claims, No Drawings

ESTER DISPERSANT COMPOSITION FOR SOOT HANDLING IN EGR ENGINES

BACKGROUND OF THE INVENTION

The present invention relates to dispersants for use in fuels and in engine oil lubricants, especially for reducing soot-induced viscosity increase in heavy duty diesel engine lubricants.

Heavy duty diesel vehicles may use exhaust gas recirculation (EGR) engines in efforts to reduce environmental emissions. Among the consequences of recirculating the exhaust gas through the engine are different soot structures and increased viscosity of the oil at lower soot levels, compared with engines without EGR. It is desirable that oil exhibit minimal viscosity increase, e.g., less than 12 $mm^2$/sec (cSt) at a soot loading of 6 weight % in a Mack T-11 EGR engine test.

Current methods used to disperse EGR soot include the use of dispersant viscosity modifiers (DVM's) consisting of a maleinated ethylene/propylene copolymer capped with an aromatic amine. One such aromatic amine is 4-aminodiphenylamine (ADPA) as discussed in Nalesnik, et al., U.S. Pat. No. 4,863,623.

U.S. Pat. No. 4,234,435, Meinhardt et al., Nov. 18, 1980, discloses a composition wherein a succinated polybutene is condensed with either an alkyl polyamine to make a succinimide dispersant or an alkyl polyol to make a succinic ester dispersant. U.S. Patent Application 2006/0025316, published Feb. 2, 2006, discloses a reaction product of a polymer comprising carboxylic acid functionality and an amine where the resulting product is used as a viscosity modifier in a lubricant.

The present invention provides an alternative to the DVM's discussed above for improved soot handling by using a succinic ester-containing dispersant. It is known that ester containing dispersants disperse sludge well but are not good soot dispersants. It is surprising then, that the ester-containing dispersants described herein show excellent soot dispersive characteristics.

The present invention, therefore, solves the problem of soot related increases in lubricant viscosity by providing improved soot dispersion and toleration properties, particularly in diesel engines, and especially in heavy duty diesel engines employing exhaust gas recirculation.

SUMMARY OF THE INVENTION

The present invention provides a composition comprising the reaction product of (a) a hydrocarbyl substituted succinic acylating agent; (b) a polyol component comprising hydroxyl functionality or a reactive equivalent thereof; and (c) an aromatic amine containing at least one N—H group; where said components (b) and (c) are reacted in any order or simultaneously with component (a). In one embodiment of the invention components (a) and (b) are reacted and then component (c) is added and reacted.

Suitable amines for use in this invention include 4-aminodiphenylamine, 3-nitroaniline, 4-phenylazoaniline, 4-(4-nitrophenylazo)aniline, sulfamethazine, 4-aminoacetanilide, 3-aminoacetanilide, aminoquinoline, aminobenzimidazole, the commercial dye Fast Violet B, the commercial dye Fast Blue RR, and combinations thereof.

The present invention further provides a process for lubricating a mechanical device, including an internal combustion engine, comprising supplying thereto the composition described above. Also provided is a process for improving the soot-handling performance of a lubricating oil composition incorporating into said composition a minor amount of the composition described above.

DETAILED DESCRIPTION OF THE INVENTION

Various preferred features and embodiments will be described below by way of non-limiting illustration.

(a) The hydrocarbyl substituted succinic acylating agents. The material employed as component (a) in the invention is not particularly limited, provided that it contains succinic acid functionality or a reactive equivalent of succinic acid functionality (e.g., anhydride or ester). The hydrocarbyl substituent may be a polymeric material, such as polyisobutylene.

Various other polymer backbones have been used for preparing dispersants. For example, polymers derived from isobutylene and isoprene have been used in preparing dispersants and are reported in PCT publication WO 01/98387.

The hydrocarbyl-substituted succinic acylating agents include succinic acids, halides, esters, and anhydrides. The hydrocarbyl group generally contains an average of at least 8 up to 350 carbon atoms. In one embodiment, the hydrocarbyl group is derived from a polyalkene.

The polyalkene may be any of those described above and is characterized by an $\overline{M}_n$ (number average molecular weight) of at least 500. Generally the polyalkene is characterized by an $\overline{M}_n$ of 500 up to 5000. In another embodiment $\overline{M}_n$ is 1500 to 2500. In one embodiment, the polyalkene has an $\overline{M}_n$ from 1300 to 5000, or 1500 to 2500, and a $\overline{M}_w/\overline{M}_n$ of at least 1.5. The preparation and use of substituted succinic agents wherein the substituent is derived from such polyolefins are described in U.S. Pat. No. 4,234,435.

The polyalkenes include homopolymers and interpolymers of polymerizable olefin monomers of 2 to 16 carbon atoms. The olefins may be monoolefins such as ethylene, propylene, 1-butene, isobutene, and 1-octene; or a polyolefinic monomer, or a diolefinic monomer, such as 1,3-butadiene and isoprene. In one embodiment, the interpolymer is a homopolymer. An example of a polymer is a polybutene. In one instance about 50% of the polybutene is derived from isobutylene. The polyalkenes are prepared by conventional procedures.

In another embodiment, the hydrocarbyl group contains an average from 8 to 40 carbon atoms. In one embodiment, the hydrocarbyl group contains an average from 16 to 18 carbon atoms. In another embodiment, the hydrocarbyl group is a tetrapropenyl group.

The hydrocarbyl group may be derived from one or more olefins having from 2 to 40 carbon atoms or oligomers thereof. These olefins include alpha-olefins or isomerized alpha-olefins. Examples of the alpha-olefins include ethylene, propylene, butylene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, and 1-tetracosene. Commercially available alpha-olefin fractions that may be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, and $C_{22-28}$ alpha-olefins. In one embodiment, the olefins are $C_{16}$ and $C_{16-18}$ alpha-olefins. Additionally, $C_{30}+$ alpha-olefin fractions such as those available from Chevron can be used. In one embodiment, the olefin monomers include ethylene, propylene and 1-butene.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. These procedures are described for example in U.S. Pat. No. 4,108,889.

The mono-olefins may be derived from the cracking of paraffin wax. Other mono-olefins can be derived from the ethylene chain growth process. Other methods for preparing the mono-olefins include chlorination-dehydrochlorination of paraffin and catalytic dehydrogenation of paraffins. The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632,657, Interscience Publishers, Div. of John Wiley and Son, 1971.

The succinic acylating agents are prepared by reacting the above-described olefins, isomerized olefins or oligomers thereof with unsaturated dicarboxylic reactants, such as itaconic, citraconic, or maleic acids, anhydrides or esters at a temperature of 160° C. up to 240° C. Maleic anhydride is a suitable unsaturated carboxylic reactant. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535-537. In one embodiment, the alkenyl group is derived from oligomers of lower olefins, i.e., olefins containing from 2 to 4 carbon atoms. Examples of these olefins include ethylene, propylene and butylene.

The olefin, olefin oligomer, or polyalkene may be reacted with the carboxylic reactant such that there is at least one mole of reactant for each mole of olefin, olefin oligomer, or polyalkene that reacts. An excess of carboxylic reactant may be used. In one embodiment, this excess is between 5% to 25%. In another embodiment, the excess is greater than 40%, or greater than 50%, and even greater than 70%.

The conditions, i.e., temperature, agitation, solvents, and the like, for forming the hydrocarbyl-substituted succinic acylating agent, are known to those in the art. Examples of patents describing various procedures for preparing useful acylating agents include U.S. Pat. No. 3,172,892 (Le Suer et al.); U.S. Pat. No. 3,215,707 (Rense); U.S. Pat. No. 3,219,666 (Norman et al); U.S. Pat. No. 3,231,587 (Rense); U.S. Pat. No. 3,912,764 (Palmer); U.S. Pat. No. 4,110,349 (Cohen); and U.S. Pat. No. 4,234,435 (Meinhardt et al); and U.K. 1,440,219.

(b) The Polyol. In regards to the present invention, the term Polyol refers to polymers and monomers with multiple hydroxyl functional groups which are available for organic reactions. The polyols used in the invention may be represented by the formula:

wherein in the foregoing formula, R is an organic group having a valency of m, R is joined to the OH groups through carbon-to-oxygen bonds, and m is an integer from 2 to 10, and in one embodiment 2 to 4. The polyol may be an alkyl polyol, an aromatic polyol, a monomeric polyol, a polymeric or oligomeric polyol or a mixture thereof.

An alkyl polyol is a material made up of an alkyl group which also contains at least two hydroxyl groups. Examples of alkyl polyols include 1,4-butane-diol, 1,6-hexane-diol, 1,8-octane-diol, neopentyl glycol, cyclohexane-dimethanol, trimethylolpropane and pentaerythritol.

An aromatic polyol is a material with an aromatic group which also contains at least two hydroxyl groups that are not directly bonded to the aromatic ring but are rather indirectly bonded to the aromatic ring through an atom or group of atoms. These hydroxyl groups are referred to as "nonphenolic" because of their indirect link to the aromatic ring.

A monomeric polyol is a monomer which also contains at least two hydroxyl groups. Monomeric polyols can react to form polymeric polyols. Examples of monomeric polyols include ethylene glycol and propylene glycol, which when polymerized form polyethylene glycol and polypropylene glycol respectively.

The polyols suitable for the present invention typically contain 2 to 40 carbon atoms and more typically 2 to 20 carbon atoms. Suitable polyols also typically contain 2 to 10 hydroxyl groups, more typically 2 to 4 hydroxyl groups. Suitable polyols include ethylene glycols such as di-, tri- and tetraethylene glycols; ethylene glycols, propylene glycols; glycerol; sorbitol; cyclohexane diol; erythritol; and pentaerythritols, including mono-, di- and tripentaerythritol.

In one embodiment the polyol component has three or more hydroxyl groups. Suitable polyols in this embodiment comprise monopentaerythritol, glycerin, or combinations thereof.

In another embodiment the polyol component has two hydroxyl groups. Suitable polyols in this embodiment comprise polyethylene glycol, polypropylene glycol, or combinations thereof.

(c) The Amine. The amines suitable for use in this invention include aromatic amines having at least one —NH group (which may be an —NH$_2$ group), that is, an amino group capable of condensing or reacting with the succinic acylating agent. Aromatic amines include those which can be represented by the general structures H$_2$N—Ar, where Ar is an aromatic group, including nitrogen-containing aromatic groups and Ar groups including any of the following structures:

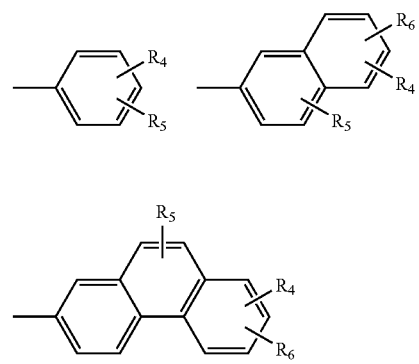

as well as multiple non-condensed aromatic rings. In these and related structures, R$_4$, R$_5$, and R$_6$ can be independently, among other groups disclosed herein, —H, —C$_{1-18}$ alkyl groups, nitro groups, —NH—Ar, —N═N—Ar, —NH—CO—Ar, —OOC—Ar, —OOC—C$_{1-18}$ alkyl, —COO—C$_{1-18}$ alkyl, —OH, —O—(CH$_2$CH$_2$—O)$_n$C$_{1-18}$ alkyl groups, and —O—(CH$_2$CH$_2$O)$_n$Ar (where n is 0 to 10).

Particularly suitable amines for use in this invention include aromatic amines with the general structure Ar—NH—Ar, where Ar is an aromatic group, including nitrogen-containing aromatic groups. Amines of this type may be represented by the following structure:

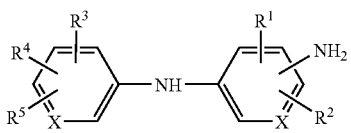

wherein each X is independently N or CH; each $R^1$ and $R^2$ is independently H, —$NH_2$, —$C_aH_b$ where a=1-4 and b=2a+1, —Cl, —$SO_3H$, or —$SO_3$ salted with Na or K; and each of $R^3$, $R^4$, and $R^5$ is independently H, —OH, —$NO_2$, —$SO_3H$, —$OC_aH_b$ where a=1-4 and b=2a+1, or —$CO_2$ salted with Na or K.

Amines of this type include 4-aminodiphenylamine, also called N-phenyl-p-phenylenediamine, which has the following structure:

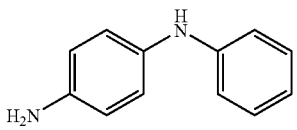 [SMILES: Nc1ccc(Nc2ccccc2)cc1]

Aromatic amines include those amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, especially those derived from naphthalene. Examples of aromatic amines include 4-aminodiphenylamine, aniline, N-alkylanilines such as N-methyl aniline, and N-butylaniline, di-(para-methylphenyl)amine, naphthylamine, N,N-dimethylphenylenediamine, 4-(4-nitrophenylazo)aniline (disperse orange 3), sulfamethazine, 4-phenoxyaniline, 3-nitroaniline, 3-aminoacetanilide (N-(3-aminophenyl)acetamide)), 4-aminoacetanilide (N-(4-aminophenyl)acetamide)), 4-amino-2-hydroxy-benzoic acid phenyl ester (phenyl amino salicylate), N-(4-amino-phenyl)-benzamide, 4-phenylazoaniline, various benzylamines such as 2,5-dimethoxybenzylamine and substituted versions of these. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which the amine nitrogen is a part of an aromatic ring, such as 3-aminoquinoline, 5-aminoquinoline, 6-aminoquinoline and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide. Yet other amines include 2,5-dimethoxybenzylamine.

Additional aromatic amines and related compounds are disclosed in U.S. Pat. Nos. 6,107,257 and 6,107,258; some of these include aminocarbazoles, aminoindoles, aminopyrroles, amino-indazolinones, aminoperimidines, mercaptotriazoles, aminophenothiazines, aminopyridines, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl)amino}butanamide.

Other aromatic amines which can be used include various aromatic amine dye intermediates containing multiple aromatic rings linked by, for example, amide structures Additional amines suitable for use in this invention include (i) amines comprising two aromatic moieties linked by an —O— group, an —N=N— group, a —C(O)NR— group where R is hydrogen or hydrocarbyl, or an —$SO_2$— group, one of said aromatic moieties bearing said condensable amino group, (ii) nitro-substituted anilines, (iii) aminoquinolines, (iv) aminobenzimidazoles, or (v) N,N-dialkylphenylenediamines, and combinations thereof. (The term "condensing" or "condensation reaction" is used herein to denote formation of an amide or imide, even if, as in the case of an anhydride reactant, no water of condensation is formed if, e.g., the reaction is with a secondary amine.)

The term "aromatic moiety" is meant to include both mononuclear and polynuclear groups. The polynuclear groups can be of the fused type wherein an aromatic nucleus is fused at two points to another nucleus such as found in naphthyl or anthranyl groups. The polynuclear group can also be of the linked type wherein at least two nuclei (either mononuclear or polynuclear) are linked through bridging linkages to each other. These bridging linkages can be chosen from, among others known to those skilled in the art, alkylene linkages, ether linkages, keto linkages, sulfide linkages, polysulfide linkages of 2 to 6 sulfur atoms, and direct carbon-carbon linkages between the groups without any intervening atoms. Other aromatic groups include those with heteroatoms, such as pyridine, pyrazine, pyrimidine, and thiophene. Examples of the aromatic groups that are useful herein include the aromatic groups derived from benzene, naphthalene, and anthracene. Each of these various aromatic groups may also be substituted by various substituents, including hydrocarbyl substituents.

The aromatic amine may, in general, contain one or more reactive (condensable) amino groups. In one embodiment of the invention a single reactive amino group is useful. Multiple amino groups, for example in the case of N,N-dimethylphenylenediamines, can be useful as well, especially if they are reacted under relatively mild conditions so as to avoid excessive crosslinking or gellation of the polymer. The above-described aromatic amines can be used alone or in combination with each other.

Components (a), the hydrocarbyl substituted succinic acylating agent, (b), the polyol, and (c), the aromatic amine, may be reacted to produce a dispersant under conditions that would be apparent to the person skilled in the art. The components may be combined sequentially, and then mixed and heated in order to promote the reaction. The components may also be combined simultaneously. Components (b) and (c) may be reacted in any order, or simultaneously, with component (a). In one embodiment, components (a) and (b) are allowed to react and then component (c) is added. Diluents, such as diluent oil, may be present during the reaction or may be added to help cool the material after the reaction is complete and the material may be filtered.

More specifically, components (a) the hydrocarbyl substituted succinic acylating agent, (b) the polyol and (c) the aromatic amine may be reacted to produce a dispersant by adding a typical amount of diluent oil to a hydrocarbyl substituted succinic acylating agent as the mixture is stirred, with a subsurface nitrogen purge, and warmed to a temperature of 140-170° C. The polyol may be added to the mixture in a single charge and the mixture may be warmed to a temperature of 185-210° C. over an 8-12 hour period and the mixture may be held, with stirring, at a temperature of 185-210° C. for an additional 4-8 hours. The aromatic amine may be added slowly over a 0.25-1 hour period and the mixture may be held, with stirring, at a temperature of 185-210° C. for an additional 4-7 hours. Diluent oil may be added to help cool the mixture and diatomaceous earth may be added and the product filtered.

Permissible variations in such process parameters will be apparent to the person skilled in the art. The resulting material gives good relative performance for soot handling compared to the alternative technologies.

Component (a), the hydrocarbyl substituted succinic acylating agent, generally may be used in the reaction such that it makes up 15% to 90% by weight, or 20% to 60% by weight, or 25% to 50% by weight of all materials charged. Component (b), the polyol, may be added at 0.1% to 30% by weight, or 1% to 10% by weight, or 2% to 5% by weight. Component (c), the aromatic amine, generally may be added such that it makes up 0.1% to 30% by weight, or 1% to 10% by weight, or 2% to 7% by weight of all materials charged. The balance of the charges typically are made up of diluent oil, which may be added at 0% to 80% by weight, 30% to 70% by weight, or 40% to 65% by weight of all materials charged. This diluent oil may be added with the hydrocarbyl substituted succinic acylating agent or separately from the hydrocarbyl substituted succinic acylating agent. The reaction may be run without any diluent oil present. The reaction may also be run with additional diluents present that do not participate in or interfere with the reaction such as diluent oil and solvents.

These ester dispersants can be post-treated as well, using materials such as urea, thiourea, carbon disulfide, aldehydes, dimercaptothiadiazoles, ketones, nitriles, epoxides, boron compounds, phosphorus compounds and other materials known to those skilled in the art. Processing conditions for these post-treating methods are known to those skilled in the art.

The derivatized polymers of the invention are useful as an additive for lubricating oils. They are multi-functional additives for lubricants being effective in providing dispersancy, viscosity index improvement and anti-oxidant properties to lubricating oils. They can be employed in a variety of oils of lubricating viscosity, including natural and synthetic lubricating oils and mixtures thereof. The novel derivatized graft copolymers can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

The Oil of Lubricating Viscosity. The lubricating compositions of this invention employ an oil of lubricating viscosity, including natural or synthetic lubricating oils and mixtures thereof. Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins and mixtures thereof, alkylbenzenes, polyphenyl, (e.g., biphenyls, terphenyls, alkylated polyphenyls), alkylated diphenyl ethers and alkylated diphenyl sulfides and the derivatives, analogs and homologues thereof. Alkylene oxide polymers and interpolymers and derivatives thereof where their terminal hydroxyl groups have been modified by processes such as esterification or etherification, constitute another useful class of known synthetic lubricating oils. Another suitable class of synthetic lubricating oils comprises the esters of di- and polycarboxylic acids and those made from $C_5$ to $C_{20}$ monocarboxylic acids and polyols and polyolethers. Other synthetic lubricating oils include liquid esters of phosphorus-containing acids, polymeric tetrahydrofurans, silicon-based oils such as the polyalkyl-, polyaryl-, polyalkoxy-, or polyaryloxy-siloxane oils and silicate oils. Synthetic oils also include those produced by a gas-to-liquid or Fischer-Tropsch process.

Unrefined, refined and rerefined oils, either natural or synthetic (as well as mixtures of two or more of any of these) of the type disclosed herein-above can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Oils of lubricating viscosity can also be defined as specified in the American Petroleum Institute (API) Base Oil Interchangeability Guidelines. The five base oil groups are as follows:

| Base Oil Category | Sulfur (%) | | Saturates (%) | Viscosity Index |
|---|---|---|---|---|
| Group I | >0.03 | and/or | <90 | 80-120 |
| Group II | <0.03 | and | >90 | 80-120 |
| Group III | <0.03 | and | >90 | >120 |
| Group IV | All polyalphaolefins (PAOs) | | | |
| Group V | All others not included in Groups I, II, III, or IV | | | |

Groups I, II, and III are mineral oil base stocks. Group III base oils are also sometimes considered to be synthetic base oils.

Other Additives. The lubricating oil compositions of this invention may contain other components. The use of such additives is optional and the presence thereof in the compositions of this invention will depend on the particular use and level of performance required. Thus the other additive may be included or excluded. The compositions may comprise a metal salt, frequently a zinc salt of a dithiophosphoric acid. Zinc salts of dithiophosphoric acids are often referred to as zinc dithiophosphates or zinc O,O'-dihydrocarbyl dithiophosphates and are sometimes referred to by the abbreviations ZDP, ZDDP, or ZDTP. One or more zinc salts of dithiophosphoric acids may be present in a minor amount to provide additional extreme pressure, anti-wear and anti-oxidancy performance. Other metal salts of dithiophosphoric acids, such as copper or antimony salts are known and may be included in the lubricating oil compositions of this invention.

Other additives that may optionally be used in the lubricating oils of this invention include detergents, dispersants, viscosity improvers, oxidation inhibiting agents, pour point depressing agents, extreme pressure agents, anti-wear agents, color stabilizers, friction modifiers and anti-foam agents. The above-mentioned dispersants and viscosity improvers may be used in addition to the compositions of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, and molybdenum compounds.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or antioxidancy properties are known and may optionally be used in addition to the products of this invention.

Detergents are typically overbased materials. Overbased materials, otherwise referred to as overbased or superbased salts, are generally single phase, homogeneous Newtonian systems characterized by a metal content in excess of that which would be present for neutralization according to the stoichiometry of the metal and the particular acidic organic compound reacted with the metal. The overbased materials are prepared by reacting an acidic material (typically an inorganic acid or lower carboxylic acid, such as carbon dioxide) with a mixture comprising an acidic organic compound, a reaction medium comprising at least one inert, organic solvent (e.g., mineral oil, naphtha, toluene, xylene) for said acidic organic material, a stoichiometric excess of a metal base, and a promoter such as a phenol or alcohol. The acidic organic material will normally have a sufficient number of carbon atoms to provide a degree of solubility in oil. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5.

Such overbased materials are well known to those skilled in the art. Patents describing techniques for making basic salts of sulfonic acids, carboxylic acids, phenols, phosphonic acids, salixarenes, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

Dispersants may be included in addition to those described in detail above as the reaction product of (a), (b), and (c). Dispersants are well known in the field of lubricants and include primarily what is known as ashless-type dispersants. Dispersants are characterized by a polar group attached to a relatively high molecular weight hydrocarbon chain. Typical dispersants include N-substituted long chain alkenyl succinimides, which may be obtained by reacting a hydrocarbyl-substituted acylating agent with an amine as described above; typically a polyalkylene amine.

Another class of dispersant is high molecular weight esters. These materials are similar to the above-described succinimide dispersants except that they may be seen as having been prepared by reaction of a hydrocarbyl acylating agent and a polyhydric aliphatic alcohol such as glycerol, pentaerythritol, or sorbitol. Such materials are described in more detail in U.S. Pat. No. 3,381,022.

Another class of dispersant is Mannich bases. These are materials which are formed by the condensation of a higher molecular weight, alkyl substituted phenol, an alkylene polyamine, and an aldehyde such as formaldehyde. Such materials may have the general structure:

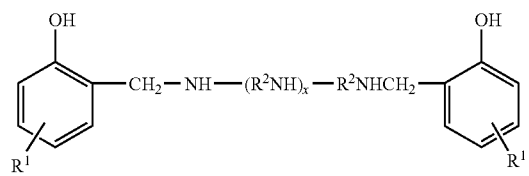

(including a variety of isomers other variations apparent to those skilled in the art) and are described in more detail in U.S. Pat. No. 3,634,515.

Other dispersants include polymeric dispersant additives, which are generally hydrocarbon-based polymers which contain polar functionality to impart dispersancy characteristics to the polymer.

Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403.

The above-illustrated additives, when present, may each be present in lubricating compositions at a concentration of as little as 0.001% by weight, usually 0.01% to 20% by weight. In most instances, they each contribute 0.1% to 10% by weight, more often up to 5% by weight.

Additive Concentrates. The various additives described herein can be added directly to the lubricant. Alternatively, however, they can be diluted with a concentrate-forming amount of a substantially inert, normally liquid organic diluent such as mineral oil or a synthetic oil such as a polyalphaolefin to form an additive concentrate. These concentrates usually comprise 0.1 to 80% by weight of the compositions of this invention and may contain, in addition, one or more other additives known in the art or described hereinabove. Concentrations such as 15%, 20%, 30% or 50% of the additives or higher may be employed. By a "concentrate forming amount" it is generally meant an amount of oil or other solvent less than the amount present in a fully formulated lubricant, e.g., less than 85% or 80% or 70% or 60%. Additive concentrates can be prepared by mixing together the desired components, often at elevated temperatures, usually up to 150° C. or 130° C. or 115° C.

Lubricating Oil Compositions. The instant invention also relates to lubricating oil compositions containing the dispersant compositions of components (a), (b), and (c) as described hereinabove. The amount of such dispersant contained in a fully formulated lubricant is typically 0.1 and 10% by weight, alternatively 0.5 to 6% or 1 to 3% by weight. As noted hereinabove, the compositions of this invention may be blended directly into an oil of lubricating viscosity or, more often, are incorporated into an additive concentrate containing one or more other additives which in turn is blended into the oil. These lubricating compositions typically contain a major amount of oil and a minor amount of the reaction product as described herein and may also contain other additives.

The described invention can be used as part of a process to improving the soot-handling performance of and/or to control the soot related viscosity increase of a lubricating oil composition, incorporating into said composition a minor amount of the composition described above.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

Examples

Comparative Example 1

A dispersant is prepared by warming 4500 grams of a succinated polyisobutylene, which is prepared by acylating 1000 Mn conventional polyisobutylene with maleic anhydride to form a monosuccinated product, to 150° C. with a sub-surface nitrogen purge and stirring. A single 491 gram portion of monopentaerythritol is added supra-surface to the warmed mixture. The preparation is stirred while it is warmed from 150° C. to 205° C. over 10 hours. The material is stirred for an additional 6 hours at 205° C. A 15:75 (wt:wt) mixture of diethylenetriamine and polyethyleneamine bottoms, (HPA-X™ from Union Carbide Corp.), is prepared and added drop-wise to the 205° C. mixture over an hour while stirring. The mixture is stirred for another hour after at 205° C. A 4093 gram charge of diluent oil is added to the mixture, cooling the preparation to 135° C. Diatomaceous earth is added to the mixture and the preparation is filtered to yield a brown oil. Yield=8662 g, weight % nitrogen=0.31, kinematic viscosity at 100° C. ("KV"; D445_100)=394 mm$^2$/s (cSt).

Example 2

A dispersant is prepared by dissolving 185 grams of a succinated polyisobutylene, which is prepared by acylating 2000 Mn conventional polyisobutylene with maleic anhydride to form a "mid-succinated" product, that is a product having about of 1.5 moles of maleic anhydride reacted per mole of polymer, in 208 grams of diluent oil. The mixture is then warmed to 160° C. with a sub-surface nitrogen purge and stirring and 14 grams of monopentaerythritol is added supra-surface in a single portion to the warmed mixture. The preparation is stirred while it is warmed from 160° C. to 190° C. over 10 hours. The material is stirred for an additional 6 hours at 190° C. A 11.6 gram charge of 4-aminodiphenylamine is added portion-wise supra-surface over 20 minutes. The mixture is stirred for an additional five hours at 190° C. A 179 gram charge of diluent oil added to the mixture, cooling the preparation to 130° C. Diatomaceous earth is added to the mixture and the preparation is filtered and cooled to yield a dark brown oil. Yield=539 g, weight % nitrogen=0.28, KV=69 mm$^2$/s (cSt).

Example 3

A dispersant is prepared by dissolving 185 grams of a succinated polyisobutylene, which is prepared by acylating 2000 Mn conventional polyisobutylene with maleic anhydride to form a mid-succinated product, in 208 grams of diluent oil. The mixture is then warmed to 160° C. with a sub-surface nitrogen purge and stirring. A single portion charge of 12.7 grams of monopentaerythritol is added supra-surface to the warmed mixture. The preparation is stirred while it is warmed from 160° C. to 190° C. over 10 hours. The material is stirred for an additional 6 hours at 190° C. and 18 grams of 4-aminodiphenylamine is added portion-wise supra-surface over 20 minutes. The mixture is stirred for an additional five hours at 190° C. A 189 gram charge of diluent oil added to the mixture, cooling the preparation to 130° C. Diatomaceous earth is added to the mixture and the preparation is filtered and cooled to yield a dark brown oil. Yield=570 g, weight % nitrogen=0.42, KV=67 mm$^2$/s (cSt).

Example 4

A dispersant is prepared by dissolving 650 grams of a succinated polyisobutylene, which is prepared by acylating 2000 Mn conventional polyisobutylene with maleic anhydride to form a mid-succinated product, that is a product having about of 1.5 moles of maleic anhydride reacted per mole of polymer, in 150 grams of diluent oil. The mixture is then warmed to 160° C. with a sub-surface nitrogen purge and stirring and 42.6 grams of trimethylolpropane is added supra-surface in a single portion to the warmed mixture. The preparation is stirred while it is warmed from 160° C. to 190° C. over 10 hours. The material is stirred for an additional 6 hours at 190° C. A 63.8 gram charge of 4-aminodiphenylamine is added portion-wise supra-surface over 20 minutes. The mixture is stirred for an additional five hours at 190° C. A 599 gram charge of diluent oil added to the mixture, cooling the preparation to 130° C. Diatomaceous earth is added to the mixture and the preparation is filtered and cooled to yield a dark brown oil. Yield=1417 g, weight % nitrogen=0.66, KV=184 mm$^2$/s (cSt).

Example 5

A dispersant is prepared by dissolving 650 grams of a succinated polyisobutylene, which is prepared by acylating 2000 Mn conventional polyisobutylene with maleic anhydride to form a "mid-succinated" product, that is a product having about of 1.5 moles of maleic anhydride reacted per mole of polymer, in 151 grams of diluent oil. The mixture is then warmed to 160° C. with a sub-surface nitrogen purge and stirring and 47.8 grams of glycerol is added supra-surface in a single portion to the warmed mixture. The preparation is stirred while it is warmed from 160° C. to 190° C. over 10 hours. The material is stirred for an additional 6 hours at 190° C. A 63.8 gram charge of 4-aminodiphenylamine is added portion-wise supra-surface over 20 minutes. The mixture is stirred for an additional five hours at 190° C. A 603 gram charge of diluent oil added to the mixture, cooling the preparation to 130° C. Diatomaceous earth is added to the mixture and the preparation is filtered and cooled to yield a dark brown oil. Yield=1373 g, weight % nitrogen=0.53, KV=294 mm²/s (cSt).

A soot-dispersive screen test is performed on the experimental samples prepared above. In this test, a specified amount (e.g., 0.18 actives weight percent) of the candidate chemistry is added to a used oil sample from the end of a test drain from a Mack™ T-11 engine test that exhibited a relatively high degree of viscosity increase. The sample is subjected to oscillation and the ability of the candidate to reduce the buildup of associations between molecules of soot is measured as a modulus, by a method described in Society of Automotive Engineers (SAE) Technical Paper 2001-01-1967, "Understanding Soot Mediated Oil Thickening: Rotational Rheology Techniques to Determine Viscosity and Soot Structure in Peugot XUD-11 BTE Drain Oils," M. Parry, H. George, and J. Edgar, presented at International Spring Fuels & Lubricants Meeting & Exhibition, Orlando, Fla., May 7-9, 2001. The calculated parameter is referred to as G'. The G' of the sample treated with the experimental chemistry is compared to the G' of the drain oil without the additive, the latter of which is defined as 1.00. Values of G' less than 1.00 indicate increasing effectiveness at soot dispersion. Values of G' greater than 1.00 indicate that the dispersant additive actually promotes soot agglomeration. The table below shows G' values at equal treat rates for the examples and for the commercially available product PA1160, made by DSM.

| Dispersant from: | G' Modulus |
|---|---|
| Comparative Example 1 | 1.02 |
| Example 2 | 0.22 |
| Example 3 | 0.14 |
| Example 4 | 0.075 |
| Example 5 | 0.075 |
| PA1160 | 0.15 |

The results show that the products prepared in Examples 2, 3, 4 and 5 provide superior soot handling performance compared to Comparative Example 1. It also shows that the products prepared in Example 2 and Example 3 provide similar performance compared to the commercially available product PA1160 made by DVM and the products prepared in Examples 4 and 5 provide superior soot handling performance compared to PA1160. PA1160 is a functionalized ethylene-propylene copolymer based dispersant recognized in industry as providing excellent EGR soot handling. The claimed invention gives equivalent and better performance when compared to PA1160, and as the claimed invention is, in certain embodiments, a polyisobutylene-based material, it is typically far less costly then the ethylene-propylene based material used in PA1160.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about."

Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. The term "minor amount" means an amount of less than 50% of the substance in question as a fraction of the total composition unless otherwise indicated above.

What is claimed is:

1. A composition comprising the reaction product of:
   (a) a hydrocarbyl substituted succinic acylating agent; and
   (b) a polyol component comprising hydroxyl functionality or a reactive equivalent thereof; and
   (c) an aromatic amine containing at least one N—H group; wherein component (c), the aromatic amine, comprises two aromatic moieties linked by an —NH— group and is represented by the structure:

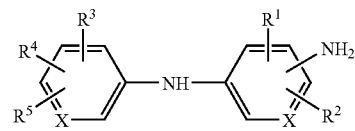

wherein each X is independently N or CH; each $R^1$ and $R^2$ is independently H, —NH$_2$, —CH$_3$, —Cl, —SO$_3$H, or —SO$_3$ salted with Na or K; and each of $R^3$, $R^4$, and $R^5$ is independently H, —OH, —NO$_2$, —SO$_3$H, —OC$_4$H$_9$, or —CO$_2$ salted with Na or K.

2. The composition of claim 1 wherein component (b), the polyol, contains at least three hydroxyl functional groups available for organic reactions.

3. The composition of claim 1 wherein component (b), the polyol, comprises pentaerythritol, polyethylene glycol, polypropylene glycol, polytetrahydrofuran, glycerin, or mixtures thereof.

4. The composition of claim 1 wherein the amount of component (a), the hydrocarbyl substituted succinic acylating agent, is about 15% to about 90% by weight, the amount of component (b), the polyol, is about 0.1% to about 30% by weight, and the amount of component (c), the aromatic amine, is about 0.1% to about 30% by weight, where the balance, if any, is made up of diluents.

5. A composition comprising an oil of lubricating viscosity and a minor amount of the composition of claim 1.

6. A lubricant composition comprising a major amount of an oil of lubricating viscosity and a minor amount of the composition of claim 1.

7. The lubricant composition of claim 6 further comprising at least one additive selected from the group consisting of detergents, viscosity modifiers, antioxidants, and anti-wear agents.

8. The lubricant composition prepared by admixing the components of claim 7.

9. A concentrate comprising the composition of claim 1 and a concentrate-forming amount of an oil of lubricating viscosity.

* * * * *